May 19, 1970
R. R. SHANKS
3,513,355
FIXED SEQUENCE MULTIPLE SQUIB CONTROL CIRCUIT
Filed Dec. 27, 1968
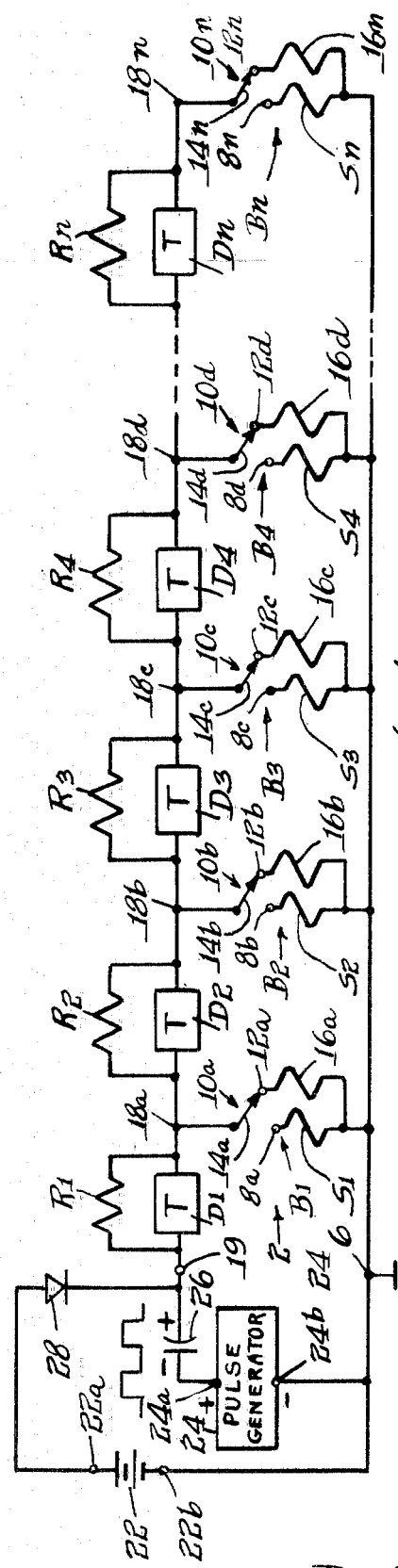
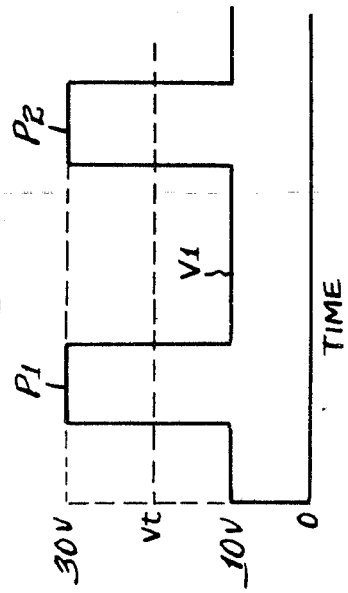
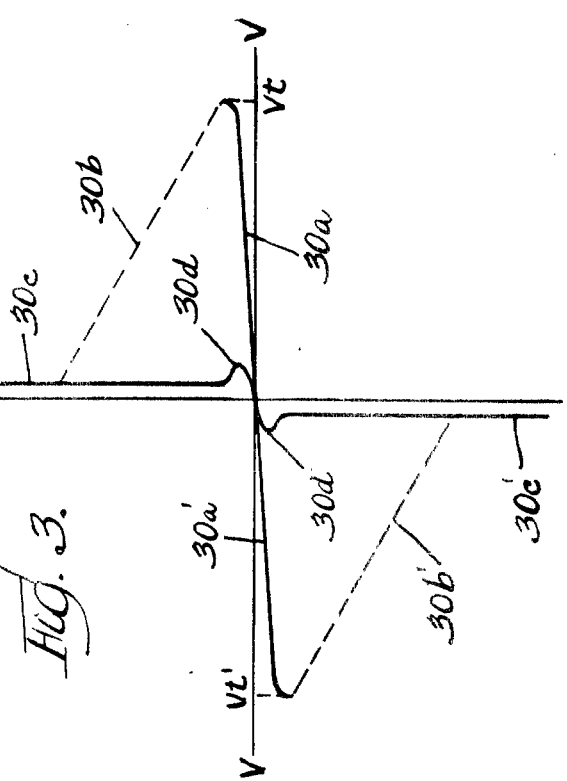
Inventor
Roy R. Shanks
By: Wallenstein, Spangenberg, Hattis & Strampel United States Patent Office 3,513,355
Patented May 19, 1970

3,513,355
FIXED SEQUENCE MULTIPLE SQUIB CONTROL CIRCUIT
Roy R. Shanks, Royal Oak, Mich., assignor to Energy Conversion Devices, Inc., Troy, Mich., a corporation of Delaware
Filed Dec. 27, 1968, Ser. No. 787,476
Int. Cl. F23g 7/02
U.S. Cl. 317—80                    9 Claims

ABSTRACT OF THE DISCLOSURE

A squib control circuit network for sequentially firing a series of squib elements connected in individual branch circuits B1, B2, B3 . . . B$n$ extending between a common point and individual voltage input points is provided including preferably similar threshold switch devices D2, D3 . . . D$n$ respectively interposed between the voltage input points of the branch circuits and a threshold switch device D1 interposed between the input to the network and the first branch circuit. Voltage divider-forming resistors R1, R2, R3 . . . R$n$ respectively are connected across the threshold switch devices D1, D2, D3 . . . D$n$ and most advantageously have the following relative values: $R2 = C(R1+R2)$, $$R3 = C(R1+R2+R3) \ldots$$

$$Rn = C(R1+R2+R3 \ldots Rn)$$

where C is preferably a constant much greater than 0.5 and less than 1.0. The input to the network is connected to a source of squib-blowing initiating voltage pulses. The threshold switch devices are triggered from a normal high resistance blocking condition to a low resistance conducting condition upon the application of a voltage thereacross which exceeds a threshold voltage value thereof which conducting condition persists until the current therethrough drops below a given holding current level. The resistors shunting the threshold switch devices have a resistance much less than the high resistance of the threshold switch devices but much higher than the resistance of the squib elements so each branch circuit is not loaded by the other branch circuit connected thereto. The above circuit operates to blow the squib elements in a predetermined sequence when the threshold voltage value of the threshold switch devices is less than C times the amplitude of the squib-blowing initiating voltage pulses.

---

An object of the invention is to provide a squib control circuit for successively firing a number of squib elements in accordance with the feeding of control pulses thereto, and which control circuit has substantially greater reliability than the circuits heretofore used for firing such squib elements in succession.

Another object of the invention is to provide a squib control circuit as described where the squib elements are blown in a predetermined sequence. A still further object of the invention is to provide a squib control circuit as described which can be readily pre-tested in the field to determine its operability under the squib firing conditions which actually exist.

The most advantageous and preferred form of the invention utilizes a network of squib element containing branch circuits where corresponding ends of the branch circuits are connected together and to a source of squib-blowing initiating pulses by threshold switch devices extending between corresponding input points or terminals of the branch circuits and, between the corresponding input point of the first branch circuit and the source of pulses. The switch devices are most advantageously like those disclosed and claimed in U.S. Pat. No. 3,271,591, granted on Sept. 6, 1966 to S. R. Ovshinsky and referred to therein as "Mechanism" devices. These "Mechanism" devices most advantageously comprise films or layers of semiconductor material applied by vacuum deposition, sputtering or screening on any conductive electrode-forming layer carried on a suitable base of insulating material. All of these switch devices, to be referred to as threshold switch devices, and associated circuit elements other than the squib elements and voltage sources may be similarly deposited by screening or otherwise on a common base of insulation material. A threshold switch device is a two-terminal device which switches from a normally high resistance current blocking condition to a low resistance conducting condition when the applied voltage exceeds some threshold voltage value, and reverts to the high resistance condition when the current flow therethrough falls below some minimum holding current value. However, while for purposes of illustration, reference is made to switch devices of the type disclosed in U.S. Pat. No. 3,271,591, other switch devices having threshold characteristics similar to those of the devices of the patent may be utilized in this invention. Thus, although of little practical value, a neon lamp and a four or five-layer diode are, in accordance with the broadest aspect of the invention, useful as threshold switch devices in the squib control circuit being described. However, these devices are discrete devices or they require special substrates, as in the case of integrated circuit type semiconductor diodes, so that they cannot be fabricated by film deposition on almost any base like the film-type semiconductor threshold switch devices disclosed in said U.S. Pat. No. 3,271,591. Furthermore, unlike neon lamps and said four and five-layer diodes, these film threshold switch devices can be fabricated with a wide selection of threshold levels of modest values (e.g., 5–30 volts) merely by controlling the thickness of the films.

Voltage divider forming resistors having values much less than the high resistance values of the threshold switch devices and much greater than the low resistance values thereof and of the resistance of the squib elements to avoid loading the same are connected across the threshold switch devices. It is most preferred that the values of the resistors progressively increase from one end of the branch circuit network to the other so most of the voltage applied to the input of the branch circuit network is dropped across only one of the threshold switch devices at a time in the circuit between the first branch circuit having an unblown squib element and the input to the branch circuit network. (The other branch circuits with unblown squib elements and the associated threshold switch devices connected to the input sides thereof are inactive because they are effectively shorted out of the circuit by the first branch circuit having an unblown squib element. Then, when this device is triggered into a low resistance condition, most of the applied voltage is applied across the active threshold switch device having the next highest shunt resistor in the circuit.

The source of squib-blowing initiating pulses advantageously includes a circuit which applies a voltage waveform of pulses superimposed on a fixed voltage level. The fixed voltage level may be supplied by a source of D.C. voltage for supplying the current necessary to blow each squib element once the one or more associated threshold switch devices between the voltage input end of the branch circuit network and the first branch circuit with an unblown squib element have been triggered from their normal high resistance blocking condition to their low resistance conducting condition. The output of the source of D.C. voltage is preferably substantially less than the threshold voltage value of the various threshold switch devices. An isolating rectifier is inserted in the connection between one of the terminals of the source of D.C. voltage and the input point of the branch circuit network connected to the threshold switch devices referred to. A capacitor is preferably connected between this branch circuit network input point and one of the output terminals of a source of pulses of a given polarity whose opposite output terminal is connected to a common line or point extending to the ends of the branch circuits remote from the one connected to the threshold switch devices. Between pulses, the capacitor charges up to the output of the source of D.C. voltage and each pulse generated by the source of pulses adds to the voltage across the capacitor to provide a resultant voltage which exceeds the highest threshold voltage value of the various threshold switch devices if they have different values. However, it is most preferred that all of the threshold switch devices have the same threshold voltage value. As above indicated, most of this voltage appears across one of the active threshold switch devices which is thereby triggered into its low resistance conducting condition following which the other active threshold switch devices are similarly switched rapidly in succession to their low resistance conducting conditions. When all the active threshold switch devices are thus rendered conductive, the source of D.C. voltage feeds a squib-blowing current to the squib element to be blown and the voltage across the input to the branch circuit network rapidly decays as the capacitor referred to discharges and recharges to the new voltage conditions of the circuit so, by the time the squib element involved blows, the voltage remaining across the input to the branch circuit network is insufficient to trigger the previously inactive, bypassed, threshold switch devices.

The above and other objects, features and advantages of this invention will become apparent upon making reference to the specification to follow, the claims and the drawings wherein:

FIG. 1 is a circuit diagram of the most advantageous form of the invention;

FIG. 2 shows the current-voltage characteristic of the threshold switch devices in FIG. 1; and FIG. 3 shows the applied voltage waveform for the circuit of FIG. 1.

As shown in FIG. 1, the circuit includes a branch circuit network including a number of branch circuits identified respectively by reference characters B1, B2, B3, B4 . . . B$n$. The branch circuits have respective squib elements S1, S2, S3, S4 . . . S$n$ each of which is a relatively expensive fuse element which, when current of a given value flows therethrough, will heat up and blow to open the branch circuit involved. The blowing of the fuse may initiate the detonation of a rocket or other detonatable device.

In the most preferred circuit illustrated, each of the squib elements is connected between a common ground line or point 6 and a stationary contact 8a, 8b, 8c, 8d . . . or 8$n$ of a manually operable, single pole, double-throw switch 10a, 10b, 10c, 10d . . . or 10$n$. Each of these single pole, double-throw switches further has a stationary contact 12a, 12b, 12c, 12d . . or 12$n$ and a movable pole or wiper 14a, 14b, 14c, 14d . . . or 14$n$. A relatively inexpensive test fuse element 16a, 16b, 16c, 16d . . . or 16$n$ is connected respectively between the stationary contact 12a, 12b, 12c, 12d . . . or 12$n$ and the grounded line 6. The movable poles or wipers 14a, 14b, 14c, 14d . . . and 14$n$ for the various branch circuits are connected respectively to separate branch input points 18a, 18b, 18c, 18d . . . and 18$n$. Threshold switch devices D2, D3, D4 . . . D$n$ are respectively connected between adjacent pairs of branch circuit input points 18a–18b, 18b–18c, 18c–18d . . . 18($n$–1)–18$n$. A threshold switch device D1 is connected between the branch input points 18a and a branch network input point 19. As previously indicated, the threshold switch devices are most advantageously the "Mechanism" devices disclosed in said U.S. Pat. No. 3,271,591. Resistors R1, R2, R3, R4 . . . R$n$ are respectively connected across threshold switch devices D1, D2, D3, D4 . . . D$n$. The movable poles 14a, 14b, 14c, 14d . . . 14$n$ of the manually operable switches 10a, 10b, 10c, 10d . . . 10$n$ are ganged together for simultaneous operation.

The test fuse elements 16a, 16b, 16c, 16d . . . and 16$n$ and the squib elements S1, S2, S3, S4 . . . and S$n$ blow when a current exceeding a given value flows therethrough for a certain minimum period. This current flows in one of these elements when all of the associated threshold switch devices connected between the first (i.e. lowest numbered) branch circuit containing an unblown squib or test fuse element and the input to the branch circuit network are triggered to a low resistance conducting condition. Before the actual firing of the detonatable devices involved, the various manually operable switches 10a, 10b, 10c, 10d . . . and 10$n$ are operated to connect the associated test fuse elements 16a, 16b, 16c, 16d . . . and 16$n$ with the associated threshold switch devices to check the operability of the threshold switch devices under actual field operating conditions. When the operation of all the threshold switch devices have been checked out by noting that all of the test fuse elements have been blown, the squib control circuit is armed by the operation of the manually operable switches to connect the threshold switch devices D1, D2, D3, D4 . . . D$n$ to the associated squib elements.

Means are provided for generating successive squib or fuse-blowing initiating voltage pulses across the input to the branch circuit network 2 extending to the various aforementioned branch circuits. Such means which may take a variety of forms, provides pulses each of which has a magnitude substantially exceeding the threshold voltage value of the threshold switch devices D1, D2, D3, D4 . . . D$n$ which, in the most preferred form of the invention are assumed to have approximately the same threshold voltage value. It is also most advantageous that the squib and fuse elements in the various branch circuits be respectively approximately identical. This means for generating squib or fuse-blowing initiating voltage pulses may be a voltage generating circuit capable of supplying pulses for a duration and at the power level required to blow the various squib or fuse elements. However, to provide a circuit capable of operating at the highest pulse repetition rate and for maximum reliability, the squib-blowing initiating voltage pulse generating means preferably comprises a source of steady D.C. voltage 22 and a pulse generator circuit 24 whose outputs are superimposed in the manner to be explained and shown in FIG. 2, where a series of pulses P1 and P2 are superimposed upon a fixed voltage level V1. In FIG. 2, pulses P1 and P2 have a base to peak amplitude of plus 20 volts and the voltage level V1 is plus 10 volts.

A capacitor 26 is connected between one of the terminals 24a of the pulse generator circuit 24 and the branch circuit network input point 19, the opposite terminal 24b of the pulse generator circuit 24 being connected to the ground line or point 6. An isolating rectifier 28 is connected between one of the terminals 22a of the source of D.C. voltage 22 and the branch circuit network input point 19. The other terminal 22b of the source of D.C. voltage is connected to the ground line or point 6. In the exemplary circuit being described, the rectifier 28 is oriented so that the voltage applied therethrough to the branch circuit network input point 19 is positive with respect to the voltage on the ground line or point 6. If the threshold switch devices D1, D2, D3, D4 . . . or D$n$ disclosed in the aforementioned patent are utilized, the circuit will operate without changing the connections of the threshold switch devices if the branch circuit network input point 19 is positive or negative with respect to the ground line or point 6. However, the isolating rectifier 28 must be properly oriented to pass the voltage on the terminal 22a of the source of D.C. voltage to the branch circuit network input point 19. Also, the pulse generator circuit 23 must generate pulses of a polarity which will add to the voltage applied across the capacitor 26 from the source of D.C. voltage 22 in a manner to be explained.

Where the threshold voltage values of the various threshold switch devices D1, D2, D3, D4 . . . Dn are substantially equal, it is most advantageous that the various resistors R1, R2, R3, R4 . . . Rn are of progressively increasing value from one end of the branch circuit network to the other. To minimize loading effects, this progression of resistor values preferably increases from the input to the output end thereof in the following manner:

$$R2 = C(R1+R2)$$

$$R3 = C(R1+R2+R3)$$

$$R4 = C(R1+R2+R3+R4)$$

$$Rn = C(R1+R2+R3 \ldots +Rn)$$

where C is less than 1.0 and preferably substantially greater than 0.5 (for example, 0.8).

As previously indicated, since each squib and fuse element has a resistance substantially lower than that of any of the resistors R1, R2, R3, R4 . . . Rn, (for example, 1–10 ohms), the first branch circuit containing an unblown squib or fuse element will effectively short circuit or bypass that part of the network on the side of the branch circuit involved remote from the input side thereof. Also, the various resistors R1, R2, R3, R4 . . . Rn form a voltage divider network such that C times the amplitude of the applied voltage appears across the threshold switch device across which the largest resistor is connected between the branch circuit involved and the branch circuit network input point 19. Thus, in the specific example indicated by FIG. 2, when a voltage pulse of plus 30 volts is applied to the input of the branch circuit network, the voltage applied across the largest resistor in the active portion of the circuit will be 24 (.8×30) volts which exceeds the assumed threshold voltage value of the associated threshold switch device so as to trigger the same into its low resistance conducting condition. This assumes that the high resistance of the threshold switch devices in their blocking condition is at least 10 and preferably 100 or more times greater than the resistance of any of the voltage divider-forming resistors so the resistors are not loaded by the threshold switch devices. When a threshold switch device is so triggered, it has a low resistance (for example, 1–10 ohms) which is insignificant relative to any of the resistors R1, R2, R3 . . . Rn, so most of the applied voltage will then immediately be applied across the threshold switch device having the next highest threshold voltage divider-forming resistor shunting the same. In this way, all of the threshold switch devices between the first branch circuit containing an unblown fuse element and the input point 19 are rapidly triggered in sequence to a low resistance conducting condition while the applied voltage pulse persists. Then, a squib-blowing current flows from the source of D.C. voltage 22 to the branch circuit involved to blow the associated squib or fuse element.

Between the generation of pulses, the pulse generator circuit 24 forms a low resistance path for effecting charging of the capacitor 26 from the source of D.C. voltage 22 through the isolating rectifier 28. Thus, capacitor 26 will charge up to the output of the source of D.C. voltage 22, which is assumed to be 10 volts. (The plates of the capacitor 26 have been given polarity markings in FIG. 1 to show the direction in which the capacitor 26 is charged between generation of the pulses by the pulse generator circuit 24.) When the pulse generator circuit 24 generates a 20 volt voltage pulse, this pulse adds to the voltage across the capacitor 26 to produce 30 volts at the branch circuit network input point 19.

When a fuse or squib element blows and current stops flowing in the branch circuit involved, the associated conducting threshold switch devices reset to their normal high resistance condition. It is assumed that by the time the fuse or squib element blows, the pulse generated by the pulse generator circuit 24 involved will have disappeared, although this is not absolutely necessary for proper operation of the circuit. As previously indicated, once such pulse terminates, the capacitor 26 will again charge up to the output of the source of D.C. voltage 22 through a rather short time constant circuit, so that the circuit is immediately ready to receive another pulse for inititaing another fuse or squib element blowing operation. It is apparent that successive application of pulses to the branch circuit network 2 will ultimately blow all the fuse or squib elements in the various branch circuits.

FIG. 3 is an I–V curve illustrating the operation of the threshold switch devices D1, D2, D3, D4 . . . Dn. As previously indicated, each of these devices is normally in a high resistance condition and, as the D.C. voltage applied to the terminals thereof is increased from zero, the voltage-current characteristics of the device is illustrated by the curve portions 30a and 30a' for voltages of opposite polarity, the electrical resistance of the device then being high and substantially blocking the current flow therethrough. When the voltage is increased to the threshold voltage value $V_t$ or $V_t'$ thereof, the high electrical resistance of the device substantially instantaneously decreases in at least one path in the semiconductor material between the terminals thereof, the substantially instantaneous switching being indicated by the curve portions 30b and 30b' thereof. This provides a low electrical resistance or conducting condition for conducting current therethrough. The low electrical resistance is many orders of magnitude less than the high electrical resistance. The conducting condition is illustrated by the curve portion 30c and 30c'. In the low resistance current conducting condition the device has a voltage drop which is a minor fraction of the voltage drop in the high resistance blocking condition near the threshold value $V_t$ or $V_t'$.

As the voltage is decreased, the current decreases along the curve portion 30c or 30c', and, when the current decreases below a minimum current holding value, the low electrical resistance of said at least one path immediately returns to the high electrical resistance as ilustrated by the curve portion 30d and 30d' to re-establish the high resistance blocking condition. In other words, a current is required to maintain the threshold switch device in its conducting condition and when the current falls below a minimum current holding value, the low electrical resistance immediately returns to the high electrical resistance. It should be observed that each of the threshold switch devices is symmetrical in its operation, it blocking current substantially equally in each direction for a given voltage and it conducting current substantially equally in each direction for a given voltage, and the switching between the blocking and conducting conditions being extremely rapid.

A typical value for the high electrical resistance of a threshold switch device disclosed in the aforesaid patent is 1 or more megohms; a typical value for the low electrical resistance thereof is 10 ohms or less; a typical range of threshold voltage values thereof is 20–30 volts; the voltage drop thereacross in the conducting condition thereof is usually 1.5 volts or less; and the response time thereof (i.e. the period starting with the application of a switching voltage and ending with the instant the device completes a switching operation to its low resistance conducting condition) is usually several hundred nanoseconds.

It should be understood that numerous modifications may be made in the most preferred form of the invention described above without deviating from the broader aspects thereof. For example, in accordance with the broadest but less preferred aspects of the invention, the aforementioned voltage divider-forming resistors may be omitted if the high resistance values of the threshold switch devices are themselves of the same progressively increasing values as the described resistors (which result is very difficult to achieve), assuming that their threshold voltage values are approximately equal. Also, the threshold voltage values of the threshold switch devices may be varied and the voltage divider-forming resistors varied accordingly to ensure a proper triggering sequence.

I claim:

1. A squib control circuit comprising a branch circuit network including branch circuits B1, B2 . . . B$n$ respectively including squib elements S1, S2 . . . S$n$ each of which, when a given current is fed therethrough for a given duration, heats and blows to trigger a given operation and open the branch circuit involved; energizing circuit means for providing successive squib-blowing initiating voltage pulses to blow the squib elements S1, S2 . . . S$n$ in the order named and each of which pulses is to initiate the flow of said given current for at least said given duration to effect the blowing of a squib element in a different branch circuit when there is a low resistance between said energizing circuit means and the squib element to be blown; a resettable threshold switch device D1 connected between said energizing circuit means and the first branch circuit B1 and other similar threshold switch devices D2, D3 . . . D$n$ respectively connected between the branch circuit pairs B1–B2, B2–B3 . . . B($n$–1)–B$n$, each of said threshold switch devices normally presenting a resistance many orders greater than said low resistance to provide a current blocking condition and wherein said high resistance in response to a voltage applied thereacross above a given threshold voltage value decreases to a low resistance to provide a conducting condition for substantially conducting current therethrough, which conducting condition persists until the current flowing therethrough drops below a given holding current level; voltage divider-forming resistors R1, R2 . . . R$n$ shunting said threshold switch devices D1, D2 . . . D$n$, the resistors having resistances much less than the high resistance and much greater than the low resistance of the threshold switch devices, and much greater than the resistance of the squib elements so no branch circuit is significantly loaded by the other branch circuits, the resistances of the resistors being selected to form a voltage divider network wherein all threshold switch devices between said energizing circuit means and the branch circuit nearest the energizing circuit means having a still unblown squib element will have applied thereto a voltage from an applied squib-blowing initiating voltage pulse which exceeds the threshold voltage values thereof, to trigger all of the same to a conductive condition to effect the flow of squib-blowing current to the last mentioned unblown squib element.

2. The squib control circuit of claim 1 wherein said voltage divider-forming resistors are of progressively increasing value proceeding from one end to the other of the branch circuit network so substantially all the voltage of each squib-blowing initiating voltage pulse is applied to one threshold switch device at a time connected between the first branch circuit having a still unblown squib element and the voltage input end of the branch circuit network, the last mentioned devices thereby rapidly being triggered in sequence to their conducting conditions during the generation of each squib-blowing initiating voltage pulse.

3. The squib control circuit of claim 2 wherein said resistors progressively increase in value toward the end of the branch circuit network remote from the voltage input end thereof.

4. The squib control circuit of claim 2 wherein all of the threshold level responsive switch devices have approximately the same threshold voltage values and the voltage divider-forming resistors progressively increase in resistance toward the end of the branch circuit network remote from the voltage input end thereof in the following manner: $R2=C(R1+R2)$, $$R3=C(R1+R2+R3) \ldots$$

$R n=C(R1+R2+ \ldots R n)$, C being a constant less than 1.

5. The squib control circuit of claim 4 wherein the constant C is much greater than 0.5 and less than 1.0.

6. The squib control circuit of claim 1 wherein there is provided a test circuit for testing the operation of said threshold switch devices in the squib control circuit, said test circuit including a series of test fuse elements which will blow if substituted for said squib element in said branch circuits under the aforesaid voltage and current conditions, and switch means for selectively connecting said squib elements or said test fuse elements into the circuit.

7. A squib control circuit comprising a network of branch circuits each including a squib element which, when a given current is fed therethrough for a given duration, heats and blows to trigger a given operation and open the branch circuit involved, resettable threshold switch devices respectively interconnecting corresponding ends of said branch circuits so that each but the first branch circuit is connected to the preceding branch circuit through a threshold switch device, a similar threshold switch device connected between the end of said first branch circuit connected to the aforesaid threshold switch devices and the input to the branch circuit network, energizing circuit means for providing successive squib-blowing initiating voltage pulses each of which is to initiate the flow of said given current for at least said given duration to effect the blowing of a squib element in a different branch circuit when there is a low resistance between said energizing circuit means and the squib element to be blown, each of said threshold switch devices presenting a resistance many orders greater than said low resistance to provide a current blocking condition and wherein said high resistance in response to a voltage applied thereacross above a given threshold voltage value decreases to a low resistance to provide a conducting condition for substantially conducting current therethrough, which resistance condition persists until the current flowing therethrough drops below a given holding current level, the resistance values across said threshold switch devices varying to form a voltage divider network wherein each voltage pulse generated by said energizing circuit means will effect the sequential triggering of all the threshold switch devices between the first branch circuit containing an unblown squib element and said energizing circuit means, the other branch circuits containing unblown squib elements and the associated threshold switch devices connected in series therewith being effectively short-circuited by the squib element in the first branch circuit containing an unblown squib element.

8. The squib control circuit of claim 7 wherein said energizing circuit means includes a source of D.C. voltage for supplying the current to blow said squib elements, the output of said source of D.C. voltage being substantially less than said threshold voltage values of said threshold switch devices, rectifier means, means connecting said source of D.C. voltage and said rectifier means in series across the voltage input end of said branch circuit network, a source of voltage pulses which, at least when added to the output of said source of D.C. voltage produces a resultant voltage which will apply across at least one threshold switch device in series with an unblown squib element a voltage which exceeds said threshold voltage value thereof for a period to trigger the same, a capacitor, means connecting said source of voltage pulses and said capacitor in series across the voltage input end of said branch circuit network so said capacitor will charge to the output of said source of D.C.

voltage between successive pulses and will relatively quickly charge up to the value of the applied pulses when the threshold switch devices between the first branch circuit still containing an unblown squib element and the voltage input end of the branch circuit network is initially triggered to its conducting condition prior to the blowing of the associated squib element, so the voltage across said branch circuit network then drops below the value which will trigger the other threshold level responsive switch devices when the squib element involved is blown to open the associated branch circuit.

9. The squib control circuit of claim 7 where there is provided a test circuit for testing the operation of said threshold switch devices in the squib control circuit, said test circuit including a series of test fuse elements which will blow if substituted for said squib element in said branch circuits under the aforesaid voltage and current conditions, and switch means for selectively connecting said squib elements and said test fuse elements into said branch circuits.

References Cited

UNITED STATES PATENTS

| | | | |
|---|---|---|---|
| 3,271,591 | 9/1966 | Ovshinsky | 307—258 |
| 3,311,788 | 3/1967 | Faige | 317—80 |
| 3,312,869 | 4/1967 | Werner | 317—80 |
| 3,424,924 | 1/1969 | Leisinger | 317—80 X |

VOLODYMYR Y. MAYEWSKY, Primary Examiner

U.S. Cl. X.R.

107—70.2; 317—230